United States Patent [19]

Fischer et al.

[11] Patent Number: 5,190,343
[45] Date of Patent: Mar. 2, 1993

[54] RELEASABLE FASTENING DEVICE, ESPECIALLY FOR ATTACHMENTS ON CONVERTIBLES

[75] Inventors: Ernst Fischer; Hans Götz, both of Böblingen, Fed. Rep. of Germany

[73] Assignee: Mercedes-Benz AG, Fed. Rep. of Germany

[21] Appl. No.: 748,750

[22] Filed: Aug. 16, 1991

[30] Foreign Application Priority Data

Aug. 16, 1990 [DE] Fed. Rep. of Germany ....... 4025861

[51] Int. Cl.$^5$ ................................................ B60J 7/20
[52] U.S. Cl. .................................. 296/180.5; 296/136; 292/113
[58] Field of Search ............ 296/107, 116, 117, 120.1, 296/121, 180.5, 136, 85; 292/113, DIG. 49

[56] References Cited

U.S. PATENT DOCUMENTS

| | | | |
|---|---|---|---|
| 757,848 | 4/1904 | Steidl | 292/113 |
| 779,355 | 1/1905 | Fessler | 292/113 |
| 1,090,634 | 3/1914 | Linton et al. | 292/113 |
| 1,277,294 | 8/1918 | Coghlan | 296/136 X |
| 2,207,441 | 7/1940 | Rhodes | 292/DIG. 49 X |
| 3,154,341 | 10/1964 | Booth | 296/136 |
| 4,213,643 | 7/1980 | Blind et al. | 292/DIG. 49 X |
| 4,838,604 | 6/1989 | Kochi | 296/180.5 |

FOREIGN PATENT DOCUMENTS

| | | | |
|---|---|---|---|
| 0301193 | 5/1988 | European Pat. Off. | |
| 1216699 | 5/1966 | Fed. Rep. of Germany | 292/113 |
| 2736930 | 3/1979 | Fed. Rep. of Germany | 292/113 |
| 3112214 | 10/1982 | Fed. Rep. of Germany | |
| 614832 | 12/1926 | France | 296/85 |
| 224210 | 11/1924 | United Kingdom | 296/85 |
| 2219033 | 11/1989 | United Kingdom | |

*Primary Examiner*—Dennis H. Pedder
*Attorney, Agent, or Firm*—Evenson, Wands, Edwards, Lenahan & McKeown

[57] ABSTRACT

A releasable fastening device, especially for attachments on convertibles, by means of which the attachment can be snapped reversibly without further aids to the convertible body. A hook part connected pivotably to the attachment via a tensioning device can be hooked at a body part bordering a receptacle on the convertible body and can be braced against the receptacle by means of the tensioning device, after which the fastening device is fixed in its end position by means of a beyond dead-center position of the tensioning device. Distance tolerances between the receptacle and attachment can be compensated by a change of length within the tensioning device. The tensioning device is formed only by a flexural spring which is pivotably mounted at one end on the hook part and at the other end on the attachment.

8 Claims, 1 Drawing Sheet

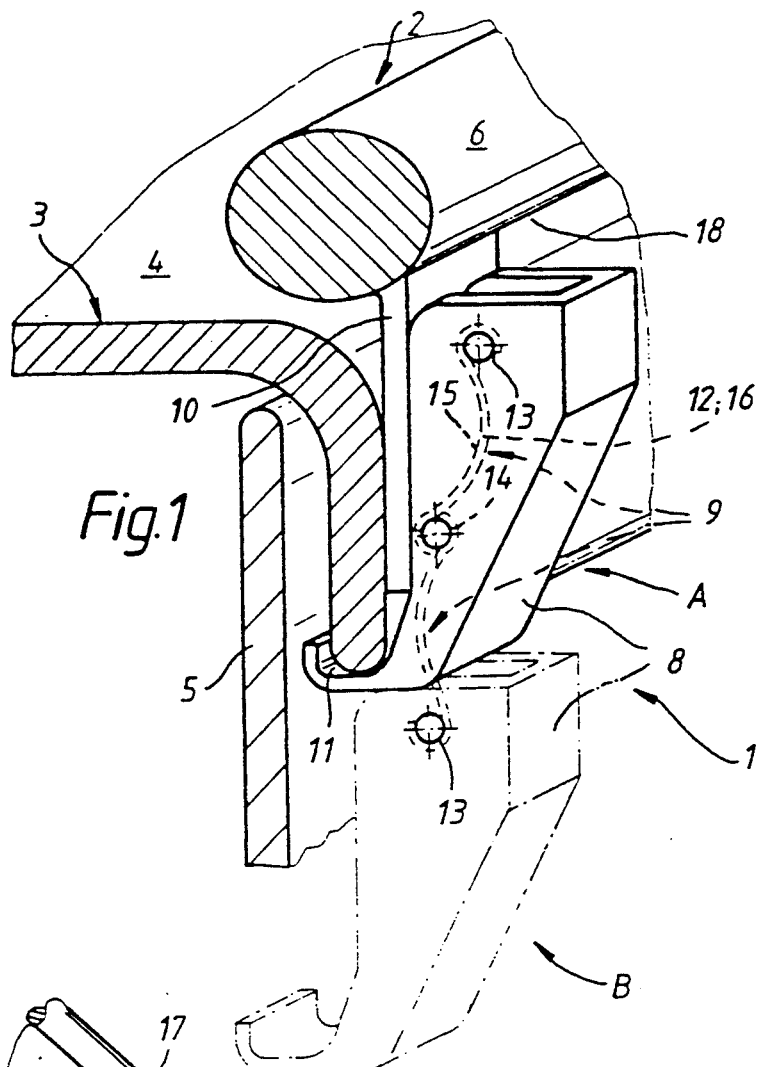
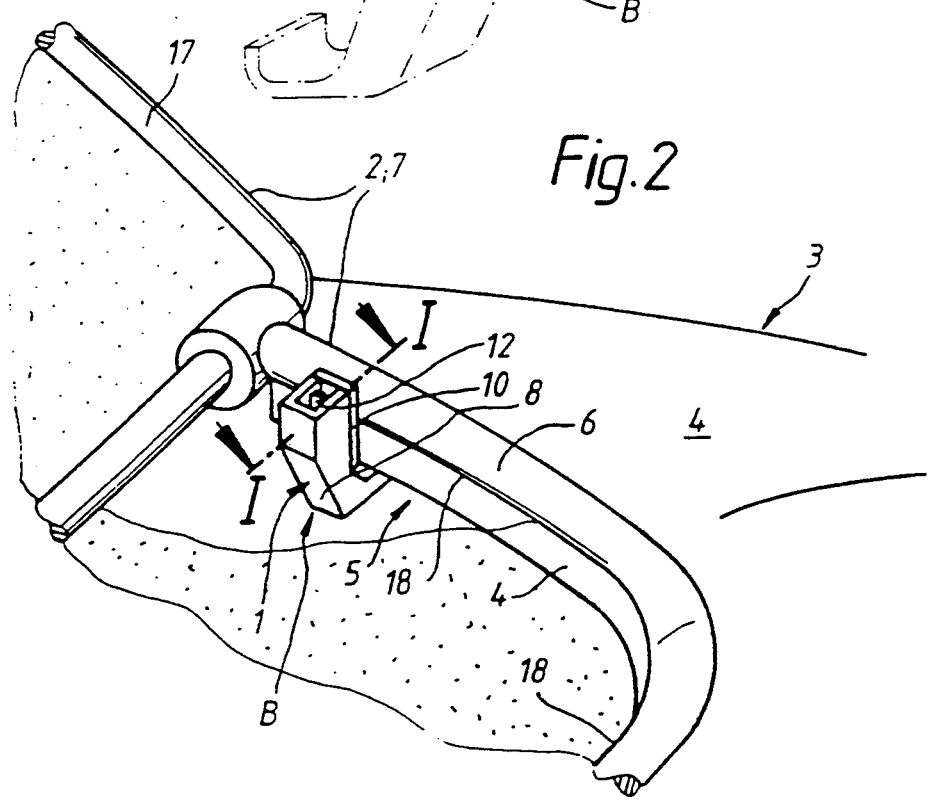

RELEASABLE FASTENING DEVICE, ESPECIALLY FOR ATTACHMENTS ON CONVERTIBLES

BACKGROUND AND SUMMARY OF THE INVENTION

The invention relates to a releasable fastening device, especially for attachments on convertibles by means of which the attachment can be snapped without further aids on the vehicle body.

German DOS 3,112,214 makes known a roof-bearer attachment for motor vehicles, having supporting members which are mounted on a carrier part and to each of which a clamping strap is secured releasably by means of a tensioning device. The tensioning device comprises an eccentric, as a result of the rotational movement of which the clamping strap can be moved into the tensioning position and into the release position. Moreover, the eccentric is adjustable in its position relative to the supporting member and to the clamping strap by means of a setscrew completing the tensioning device, with the result that positional tolerances between the supporting member and the clamping strap can be compensated.

The production of the eccentric and the correspondingly adapted design of the curved bearing surface can only be seen as involving high manufacturing costs. The adaptation of the distance between the clamping strap and the supporting member to the distance tolerances occurring from the body receptacle to the bearing surface on the supporting member can also be achieved only with difficulty by means of a setscrew, since this should both be capable of being secured in its set position and, when the attachment is changed over, be adjustable again in a simple way.

An object on which the invention is based is to provide a fastening device of the relevant generic type which is easy to operate and which involves low production costs.

This object is achieved according to preferred embodiments of the invention by an arrangement wherein the tensioning device is formed only by a flexural spring which is pivotally mounted at one end on the hook part and at the other end on the attachment.

The flexural spring, which alone constitutes the tensioning device, on the one hand performs the function of bracing the hook part by pressing this against the receptacle in the convertible body and is at the same time also the link which mounts the hook part pivotally on the attachment. Furthermore, the flexural spring can also be reduced in length in a simple way, so that distance tolerances between the receptacle and attachment are compensated by its greater or lesser deflection.

This adaptation of the flexural spring to the existing distance between the receptacle and the attachment is also made easier by a predetermined constant curvature of the flexural spring between its secured ends in the direction of its pivoting plane.

The use of a leaf spring as a flexural spring is especially recommended, since a leaf spring is suitable both as a tensioning means of constant action and as a stable link.

Moreover, the hook part can be given such a body shape what it completely covers the flexural spring, at least when the latter is in the locking position, so that there is no danger of injury.

A fastening device of this type is expedient particularly for attachments which are to be removed and then mounted again relatively frequently, as is true, for example, of a wind guard comprising two frame bodies, of which an upper frame body can be erected as a windscreen and a lower frame body remains attached to the convertible body. This lower frame body covers the rear space of the convertible, but can be detached from this, as desired, by means of the releasable fastening device.

The receptacle for the hook part of the fastening device can be provided on a cover of a folding-top box, so that it is possible also to open the folding-top box cover together with the attachment secured to it and to unfold the folding top from the folding-top box.

Other objects, advantages and novel features of the present invention will become apparent from the following detailed description of the invention when considered in conjunction with the accompanying drawings.

BRIEF DESCRIPTION OF THE DRAWINGS

FIG. 1 shows, in a section along the line I—I in FIG. 2, a releasable fastening device according to the invention in a locking position and, as represented by dot-and-dash lines, in a released position, and FIG. 2 shows this releasable fastening device in the fixing of an attachment (wind guard) to a convertible body.

DETAILED DESCRIPTION OF THE DRAWINGS

FIG. 1 shows a fastening device 1 for fixing an attachment 2 to a convertible, of which only a cover 4, belonging to the convertible body 3, of a folding-top box 5 is illustrated here. The fastening device 1 releasably fixes the attachment 2, which in this exemplary embodiment has a tubular frame body 6 of a wind guard 7, in that the attachment 2 can be snapped on reversibly without further aids by means of a hook part 8 on the convertible body 3. For this, the hook part 8 is mounted pivotally via a tensioning device 9 on a plate-shaped extension 10 of the tubular frame body 6 and can be hooked into a receptacle 11 on the convertible body 3, after which the hook part 8 can be braced against the receptacle 11 by means of the tensioning device 9.

The tensioning device 9 is formed by a flexural spring 12 which is pivotally mounted at one end 13 on the hook part 8 and at the other end 14 on the attachment 2, with the result that the hook part 8 is pivotable out of a released position B, represented by dot-and-dash lines, towards the attachment 2 into a locking position A, after which the fastening device 1 is fixed in this locking position A by means of a beyond dead-center position of the flexural spring 12.

Despite this simple version of the tensioning device 9 obtained by the flexural spring 12 alone, this can also compensate the distance tolerances between the receptacle 11 and attachment 2 by means of a change of length within the tensioning device 9, that is to say by a variation in the length of the flexural spring 12. For this, the flexural spring 12 possesses between its ends 13, 14 a constant curvature 15 in the direction of its pivoting plane, so that, during the pivoting movement of the flexural spring 12 out of its released position B into its locking position A, it can be compressed with only slight resistance as far as the distance of the receptacle 11 or the bearing point of the end 13 of the flexural spring 12 from the attachment 2 or the other end 14 of the flexural spring 12 necessitates. For this, the flexural spring 12 can advantageously be designed as a leaf spring 16 which is suitable both as a stable link and as a flexible tensioning device 9.

The hook part has a body shape approximately in the form of a U in cross-section, with the result that the flexural spring 12 is covered completely by the hook part 8, at least in the locking position A of the latter, and, because of its position near the attachment, represents a good solution in visible terms and for the purpose of preventing injuries.

As shown in FIG. 2, the wind guard 7 having two frame bodies 6, 17 pivotable from one another is attached by means of the lower frame body 6 along a rear-space closing edge 18 to the convertible body 3 and is fixed releasably to this via the fastening device 1. The second frame body 17 can thereby be pivoted upwards, as required, and protects the vehicle occupants against turbulent air flowing into the open vehicle interior.

Chosen as a receptacle for suspending the hook part 8 is a continuous end edge of the cover 4 of the folding-top box 5 which is itself pivotable upwards about a pivot axis located behind the front seat-backs and which thereby exposes the orifice for unfolding a convertible folding top (not shown) located in the folding-top box 5. The wind guard 7 arranged on the cover 4 of the folding-top box 5 does not impede this opening movement and can therefore remain fastened to the cover 4.

This fastening device 1 according to the invention can be provided on a wind guard 7 at each of the lateral edges and at a rear-space closing edge 18 aligned in the transverse direction of the vehicle, but can also be combined with any other releasable fastening device, such as, for example, a plug device along the lower frame body 6.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Releasable fastening system for releasably fastening an automobile convertible wind guard to a vehicle body part, said wind guard including upper and lower frame bodies which are pivotable with respect to one another, said lower frame body being fastenable to a convertible body by a fastening device with the lower frame body extending along a space closing edge of the convertible body, said fastening system including a fastening device comprising:

a hook part which is attached to one of the lower frame body and a convertible body part, and is releasably engageable with the other of the lower frame body and the convertible body part to lock the lower frame body and convertible body part to one another, and a tensioning device formed by a flexural spring which has one end pivotally mounted on the hook part and the other end pivotally mounted on the one of the lower frame body and the convertible body part to which the hook part is attached, said flexural spring being configured and dimensioned to move beyond a dead center position during movement of the hook part between a released position with the hook part out of engagement with the other of the lower frame body and the convertible body part and a locked position with the hook part in engagement with the other of the lower frame body and the convertible body part, said flexural spring serving to elastically hold the hook part in its locked position while accommodating distance tolerances between the hook part and the other of the lower frame body and the convertible body part, wherein the convertible body part is a cover of a folding-top box.

2. Releasable fastening system according to claim 1, wherein the hook part is attached to the lower frame body and is releasably engageable with the cover.

3. Releasable fastening system according to claim 2, wherein the flexural spring possesses between its ends a constant curvature.

4. Releasable fastening system according to claim 2, wherein the flexural spring is formed by a leak spring.

5. Releasable fastening system according to claim 2, wherein the hook part is pivotable out of its released position towards its locked position.

6. Releasable fastening system according to claim 2, wherein the hook part has a body shape which, in the locked position, covers the flexural spring completely, whilst at the same time allowing space for the movement of the flexural spring.

7. Releasable fastening system according to claim 1, wherein the folding top-box corner includes lateral edges and a rear space closing edge, and wherein at least one of the fastening devices is provided for fastening to each of the lateral edges and to the rear-space closing edge.

8. Releasable fastening system according to claim 5, wherein the hook part has a body shape which, in the locked position, covers the flexural spring completely, whilst at the same time allowing space for the movement of the flexural spring.

* * * * *